Aug. 14, 1923.

H. KNOEBEL

VEHICLE SPRING SUPPORT

Filed May 29, 1922

1,465,083

Inventor:
Herman Knoebel
by Arthur F. Durand
Atty.

Patented Aug. 14, 1923.                                                          1,465,083

UNITED STATES PATENT OFFICE.

HERMAN KNOEBEL, OF CHICAGO, ILLINOIS.

VEHICLE SPRING SUPPORT.

Application filed May 29, 1922.  Serial No. 564,648.

*To all whom it may concern:*

Be it known that I, HERMAN KNOEBEL, a citizen of the United States, and resident of Chicago, Cook County, Illinois, have invented a certain new and useful Improvement in Vehicle Spring Supports, of which the following is a specification.

This invention relates to means for supporting the springs of automobiles or other vehicles in general, but more particularly to those in which the springs extend transversely of the vehicle, and in which sagging of the rear end of the chassis or body of the vehicle is liable to result from the arrangement ordinarily employed, as the rear spring of the vehicle is very often supported at points which are too low for a heavy load.

Generally stated, therefore, the object of the invention is to provide means for elevating the rear spring of the vehicle, thereby to prevent the spring from striking the rear axle, and to prevent the rear end of the chassis or body of the vehicle from sagging under a heavy load, as will hereinafter more fully appear.

To these and other useful ends the invention consists in matters hereinafter set forth and claimed and shown in the accompanying drawings in which—

Figure 1:
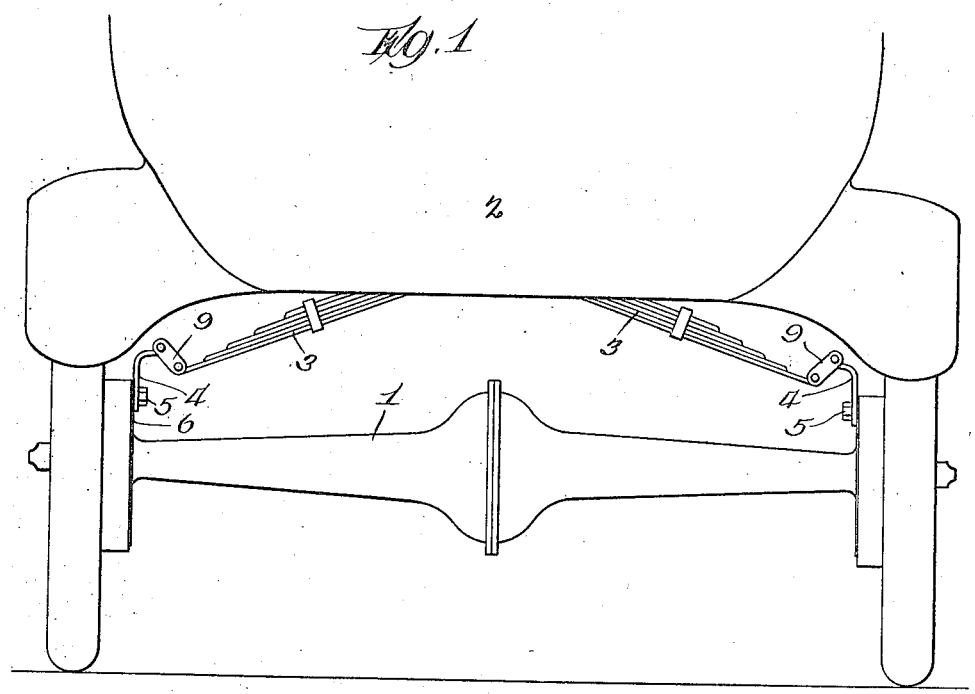
Figure 1 is a rear elevation of an automobile provided with a spring support embodying the principles of the invention.
Figure 2:
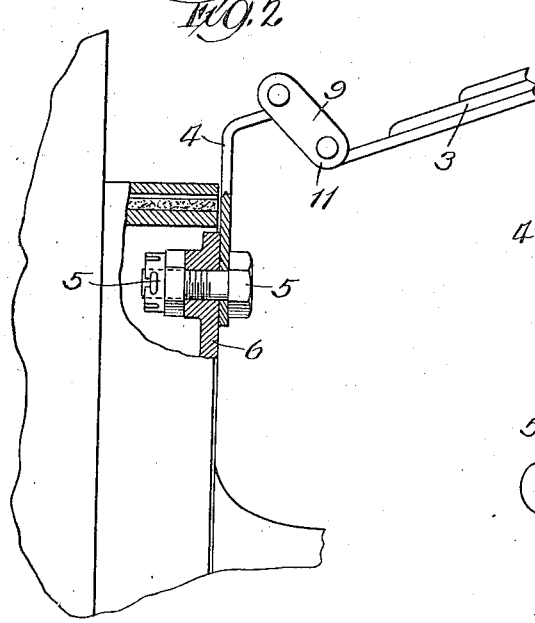
Figure 2 is an enlarged detail view of one of the supports for the spring, showing adjacent portions of the rear axle housing in section, and showing one end portion of the spring itself.
Figure 3:
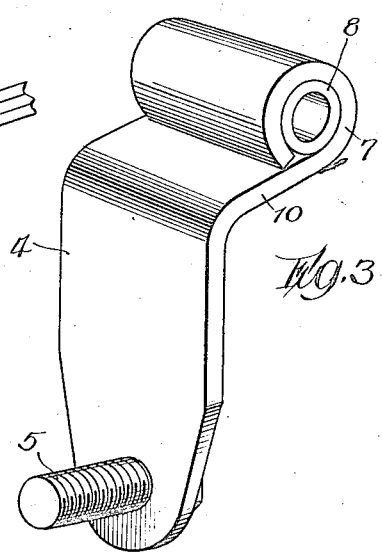
Figure 3 is a perspective of one of the spring supports shown at opposite ends of the axle housing in Figure 1 of the drawings.

As thus illustrated, the automobile or other vehicle is of the kind in which the rear axle has a housing 1, and in which the body 2 of the vehicle is supported by a transversely arranged spring 3 of any suitable or desired form. In accordance with the invention, and as illustrative of one form thereof, bracket plates 4 are secured by bolts 5 to the end walls 6 of the axle housing, in the manner shown. Each plate 4 is upstanding in character, is made from flat metal thick enough to be substantially rigid, and has its upper end portion bent inward and rolled upward and over to form a more or less cylindrical bearing 7 containing a bushing 8 of any suitable character. The shackles 9 have their upper ends mounted to swing in the bushings of the bearings 7, and the lower ends of these shackles are pivotally secured to the end portions of the spring 3, whereby these shackles are free to swing toward and away from the upstanding portions of the plates 4 when the spring moves up and down under the load weight. It will be seen that the bracket plates 4, as their bearings 7 are their uppermost portions, elevate the spring sufficiently to prevent the shackles 9 from bumping against the axle housing, and the inwardly projecting arms 10 of the bracket plates provide clearance below the bearings 7 for the lower ends 11 of the shackles 9, and for the outer ends of the spring 3, whereby these shackles 9 are supported a distance above the brake housing 12 at the ends of the axle, and can swing downward and toward the plates 4 without interference, when the spring is pressed down by a heavy load. The plates 4 nowhere extend above the shackles 9, and are inexpensive to make.

With the foregoing construction, it will be seen that the spring 3 is elevated above its ordinary position in a vehicle of this kind, sufficiently to not only prevent bumping against the axle, but also to prevent undesirable sagging of the rear end of the chassis or body of a vehicle, under a heavy load. Automobiles or other motor vehicles employing transversely arranged springs are frequently overloaded, so that they sag at the rear, and this often happens with even a normal load. In such case, the rear spring can be uncoupled at the ends thereof, from the means ordinarily provided for supporting the spring, and the plates 4 can be inserted and connected to the shackles 9 in the manner shown and described, whereby to elevate the spring 3 to the extent that the difficulty will be overcome.

What I claim as my invention is—

1. In a motor vehicle, the combination of a rear axle housing, a transversely arranged spring for supporting the load weight of the vehicle on said housing, an upstanding one-piece bracket plate secured at each end of said housing, formed from flat metal thick enough to be substantially rigid, and with the upper end portion of each bracket plate bent inward and then bent upward again and rolled over at its end to provide an overhanging bearing on the uppermost portion of said plate, and swinging shackles to connect the ends of said spring with the two bearings provided by the upper ends of said bracket plates, so that each shackle swings about a fixed axis disposed at the top of its allotted bracket, with clearance below each bearing to prevent the shackles and the spring from engaging the housing.

2. A structure as specified in claim 1, said bracket plates being each secured flatwise in place by and having only a single bolt between the housing and the bearing of the upper end of the plate.

3. A structure as specified in claim 1, said bracket plates being formed from heavy sheet metal, as shown, to prevent any portion thereof from extending above the shackles, being removably secured directly against the end wall of the housing in position to raise said shackles a distance above the ordinary position thereof, thereby to prevent sagging of the rear end of the vehicle body.

HERMAN KNOEBEL.